June 11, 1968 H. NOORDHOEK ET AL 3,387,473
TUBE AND BAR BENDING CONTROL DEVICE
Filed July 16, 1965 6 Sheets-Sheet 4
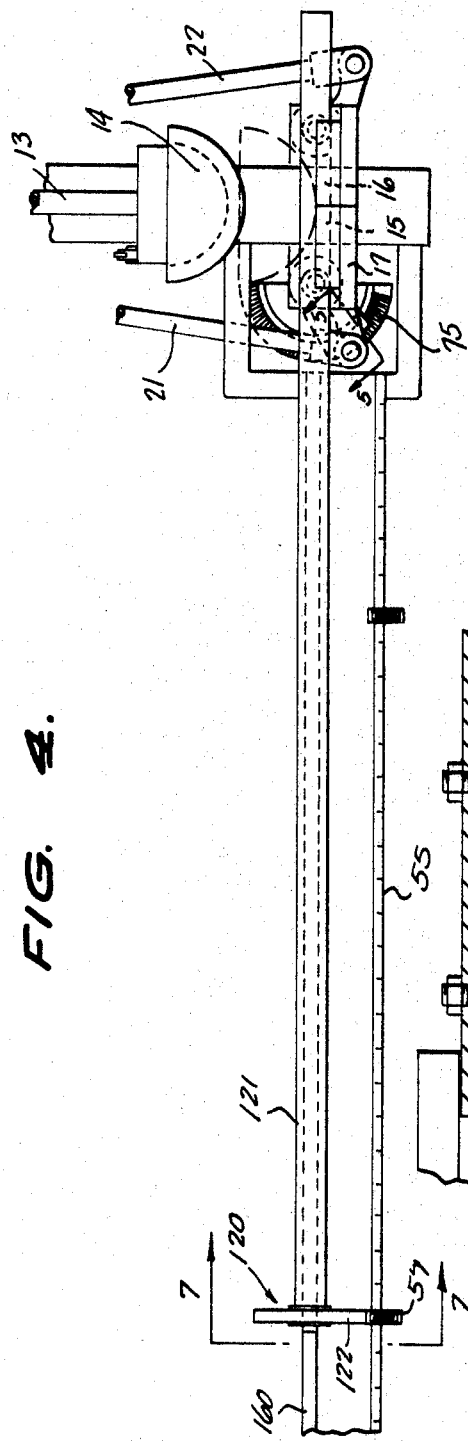
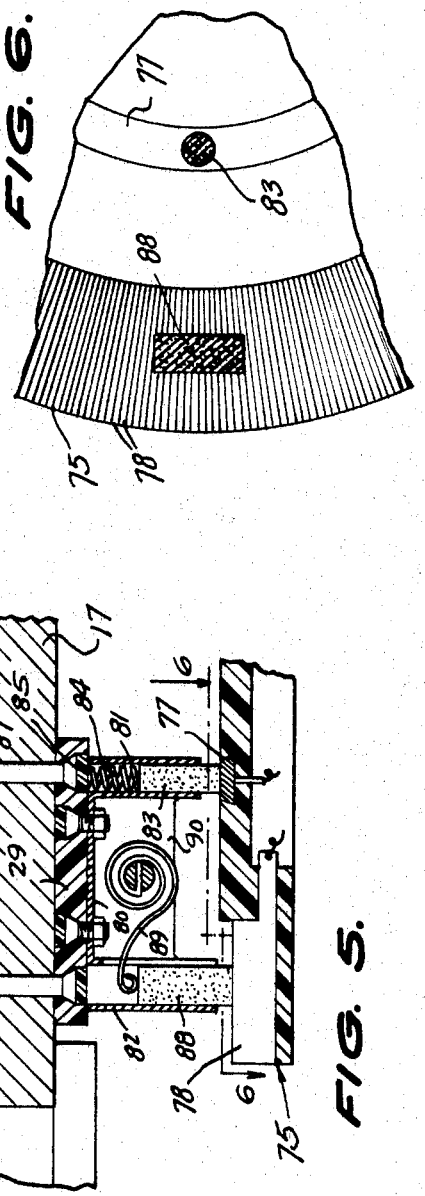
INVENTORS
HAROLD NOORDHOEK,
ROBERT NOORDHOEK,
BY
*Berman, Davidson + Berman*
ATTORNEYS.

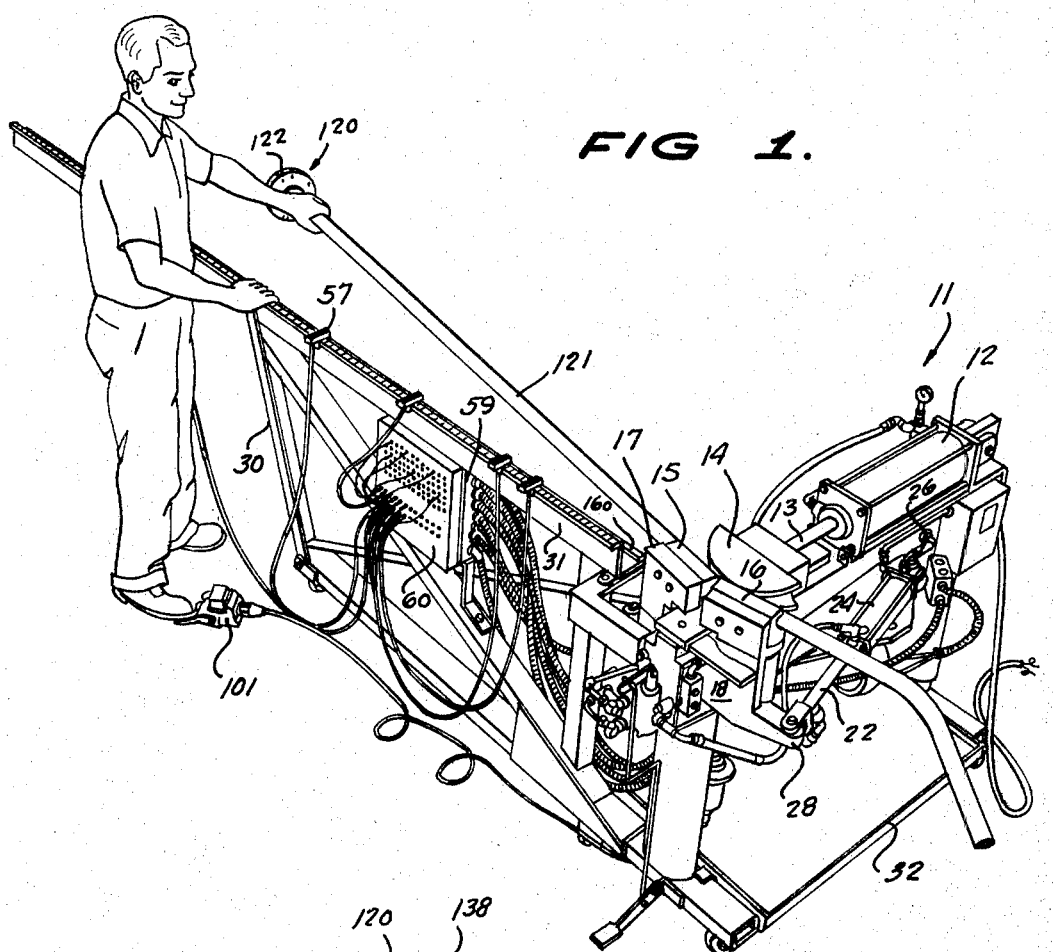
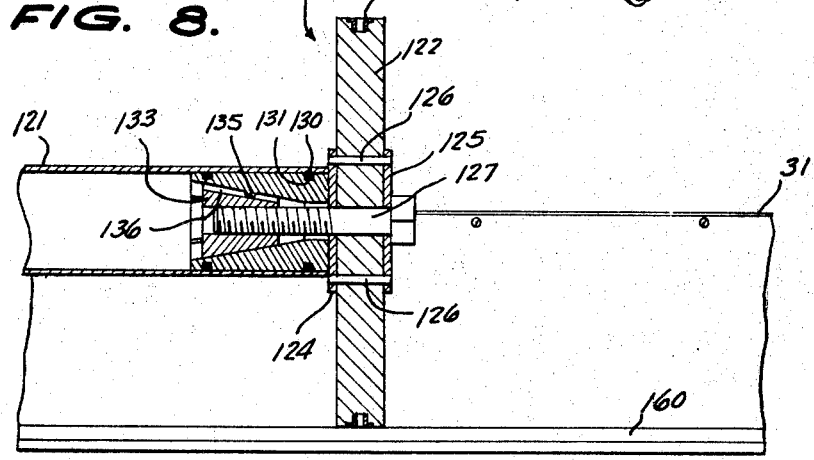

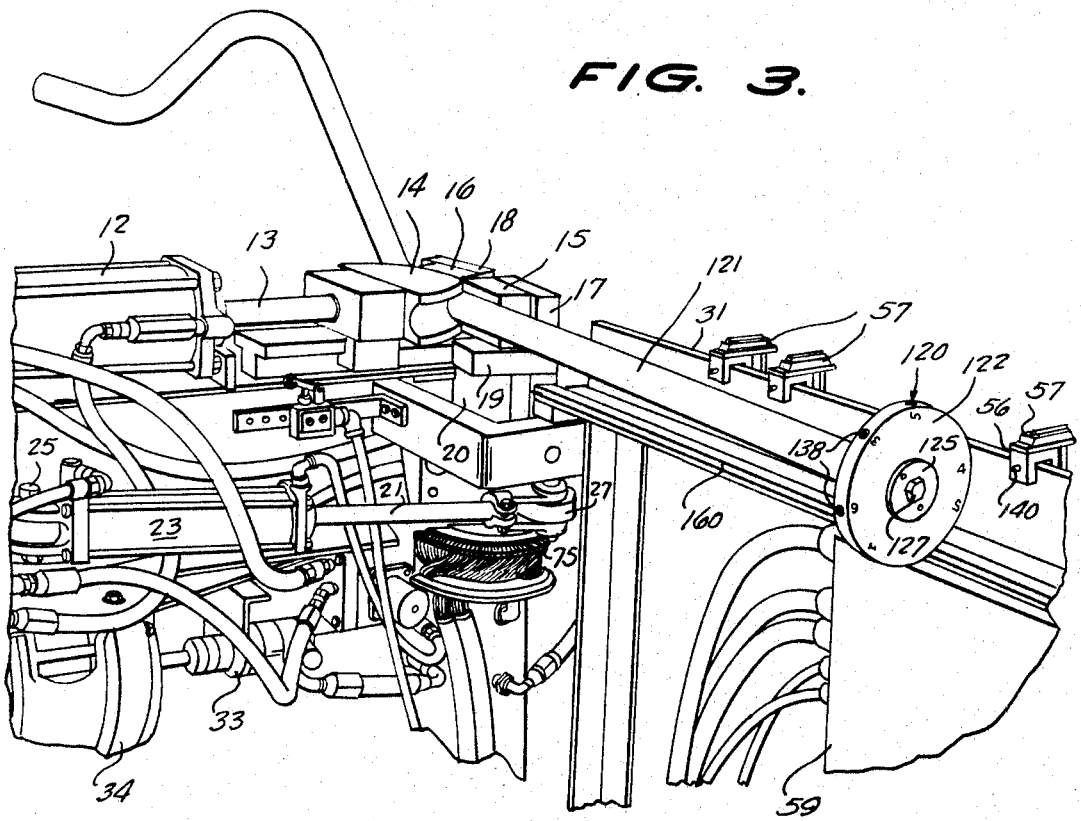
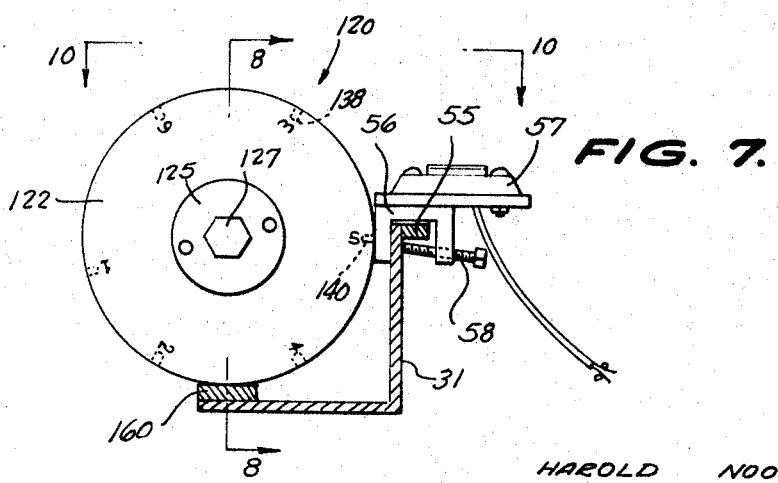

June 11, 1968  H. NOORDHOEK ET AL  3,387,473
TUBE AND BAR BENDING CONTROL DEVICE
Filed July 16, 1965  6 Sheets-Sheet 5
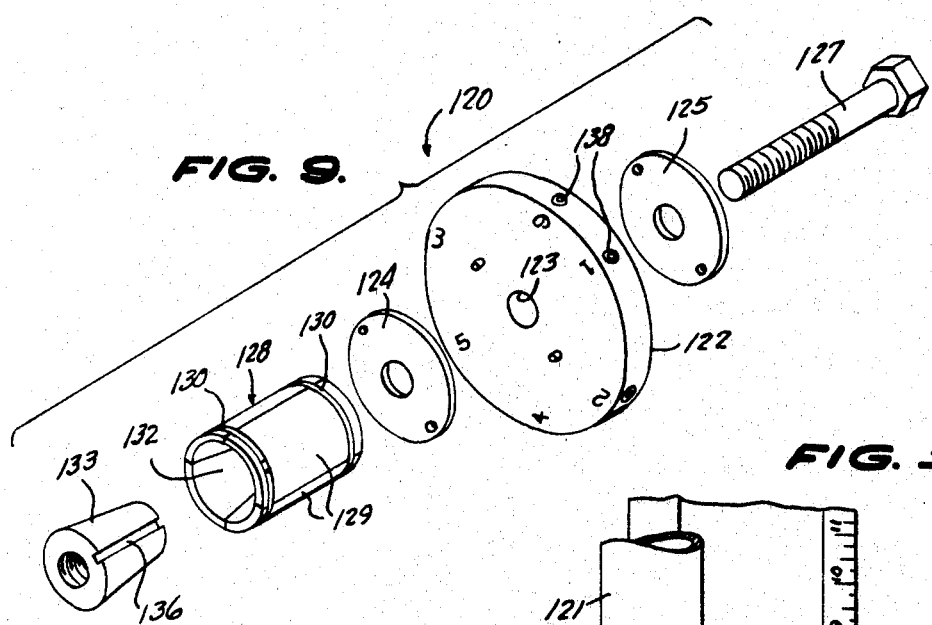
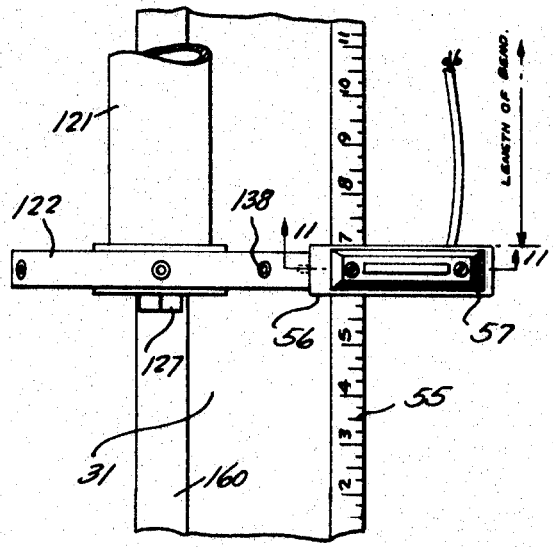
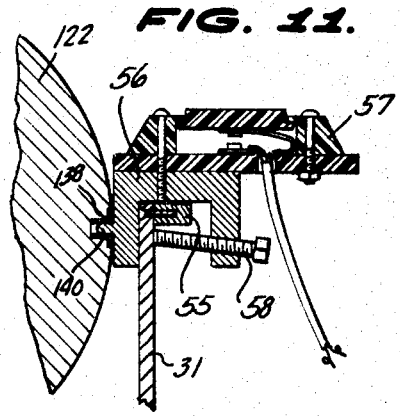
| CODE NUMBER | PIPE SIZE | | | LENGTH | | |
|---|---|---|---|---|---|---|
| TA 825-826 | 1 3/4" | | | 10' | | |
| NUMBER OF STOPS | 1 | 2 | 3 | 4 | 5 | 6 |
| A STOP LENGTHS | 14 | 52¾ | 66½ | 73½ | 85½ | 102 |
| B DEGREES | 4 | 32 | 37 | 11 | 7 | 19 |
| BLOCK | 4½ | 4½ | 4½ | 4½ | 4½ | 4½ |
| DIE - 10" RADIUS | LARGE | LARGE | LARGE | LARGE | LARGE | LARGE |
FIG. 12.
INVENTORS
HAROLD NOORDHOEK,
ROBERT NOORDHOEK
BY
Berman, Davidson & Berman
ATTORNEYS.

United States Patent Office 3,387,473
Patented June 11, 1968

3,387,473
TUBE AND BAR BENDING CONTROL DEVICE
Harold Noordhoek, 300 NE. 167th St., North Miami, Fla. 33161, and Robert Noordhoek, Miami, Fla.; said Robert Noordhoek assignor to said Harold Noordhoek
Filed July 16, 1965, Ser. No. 472,514
16 Claims. (Cl. 72—22)

ABSTRACT OF THE DISCLOSURE

Control apparatus for a compression-type tube and bar bending machine. The control apparatus is adjusted in accordance with a program including distance to the bend, depth of the bend, and angular position of the bend. An indexing disc member is mounted on the end of the elongated object to be bent. The machine has a supporting bar to support the elongated object while it is fed manually between a movable main die and cooperating swingable opposing dies, with the indexing disc member held at selected locations along the supporting bar. The supporting bar has a linear distance scale with a series of push button control switches mounted adjustably along the scale. A jack board is provided, with horizontal and vertical rows of jacks to set up control circuits, including the switches, for respective double-wound latching relays which control the energization of a valve-control relay associated with the movable main die control valve. The double-wound relays become unlatched and de-energize the valve-control relay when a brush coupled with one of the swinging die members engages the stationary arcuate commutator. The release coils of the latching relays have energizing circuits including the brush and selected segments of the commutator, the segments being selected by means of the jack board and associated jumper cables. The double-wound relays become unlatched and deenergize the valve-controlled relays when the brush engages a commutator segment corresponding to a selected jumper cable connection on the jack board. This establishes the limiting position of the swingable opposing dies. The periphery of the indexing disc member has pin sockets corresponding to the number of bends to be formed, spaced angularly in the same manner as the desired bends. The sockets are successively engaged with pins at the selected locations spaced along the supporting bar as the successive bends are made in the elongated object.

This invention relates to apparatus for bending bars or tubes, and more particularly to control means for a tube or bar bending machine to automatically insure the exact relation of each bend to the others, the exact depth of each bend, and the exact distance of each bend from the other bends and from the end of the length of tubing or rod material in which the bends are made.

A main object of the invention is to provide a novel and improved precision tube and bar bending control apparatus which is relatively simple in construction, which may be easily installed on an existing tube or bar bending machine and which insures rapid and arcuate duplication of bent tubing and bars by the use of a pre-programmed gauge device and by an electrical control circuit cooperating with the pre-programmed gauge device.

A further object of the invention is to provide an improved control apparatus for a tube or bar bending machine for insuring exact reproducibility of bends in a length of tubing or bar material in accordance with a pre-programmed gauging set-up, the apparatus involving relatively inexpensive components, being reliable in operation, being easy to use, and being especially useful in the fabrication of products such as automotive tailpipes, eliminating the necessity of maintaining a large inventory of tailpipes for different models of motor vehicles, since any desired tailpipe may be rapidly and accurately fabricated by employing a pre-programmed gauging set-up corresponding to the desired tailpipe.

A still further object of the invention is to provide an improved control apparatus especially adapted for use with a tube or bar bending machine of the hydraulic type, the control apparatus enabling any desired series of bends to be formed in a straight piece of tubing or bar material in accordance with a predetermined program, the bent rods or tubes formed by the use of a specified program being exactly identical, and the bends produced being exactly as desired with respect to location, depth and angular position relative to the axis of the associated piece of tubing or rod material.

Further objects and advantages of the invention will become apparent from the following description and claims, and from the accompanying drawings, wherein:

FIGURE 1 is a perspective view showing a bending machine equipped with an improved control apparatus constructed in accordance with the present invention and illustrating the manner in which bends are formed in a piece of tubing.

FIGURE 3 is an enlarged fragmentary rear perspective view of the main portion of the bending machine with the control apparatus installed thereon, as employed in FIGURE 1.

FIGURE 4 is a fragmentary top plan view of the control apparatus of the present invention, as employed in FIGURES 1 to 3.

FIGURE 5 is an enlarged vertical cross-sectional detail view taken substantially on the line 5—5 of FIGURE 4.

FIGURE 6 is a fragmentary horizontal cross-sectional view taken substantially on the line 6—6 of FIGURE 5.

FIGURE 7 is an enlarged transverse vertical cross-sectional view taken substantially on line 7—7 of FIGURE 4.

FIGURE 8 is a vertical cross-sectional view taken substantially on the line 8—8 of FIGURE 7, showing the internal construction of the programming disc member employed as a part of the control apparatus of the present invention.

FIGURE 9 is a perspective view showing the components of the programming disc assembly of FIGURE 8 in separated positions.

FIGURE 10 is a horizontal plan view of the programming disc assembly and parts adjacent thereto, said view being taken substantially on the line 10—10 of FIGURE 7.

FIGURE 11 is an enlarged vertical cross-sectional view taken substantially on the line 11—11 of FIGURE 10.

FIGURE 12 is a plan view of a typical program card adapted to be employed with the control apparatus of the present invention for forming a specified automotive tailpipe.

Figure 2:
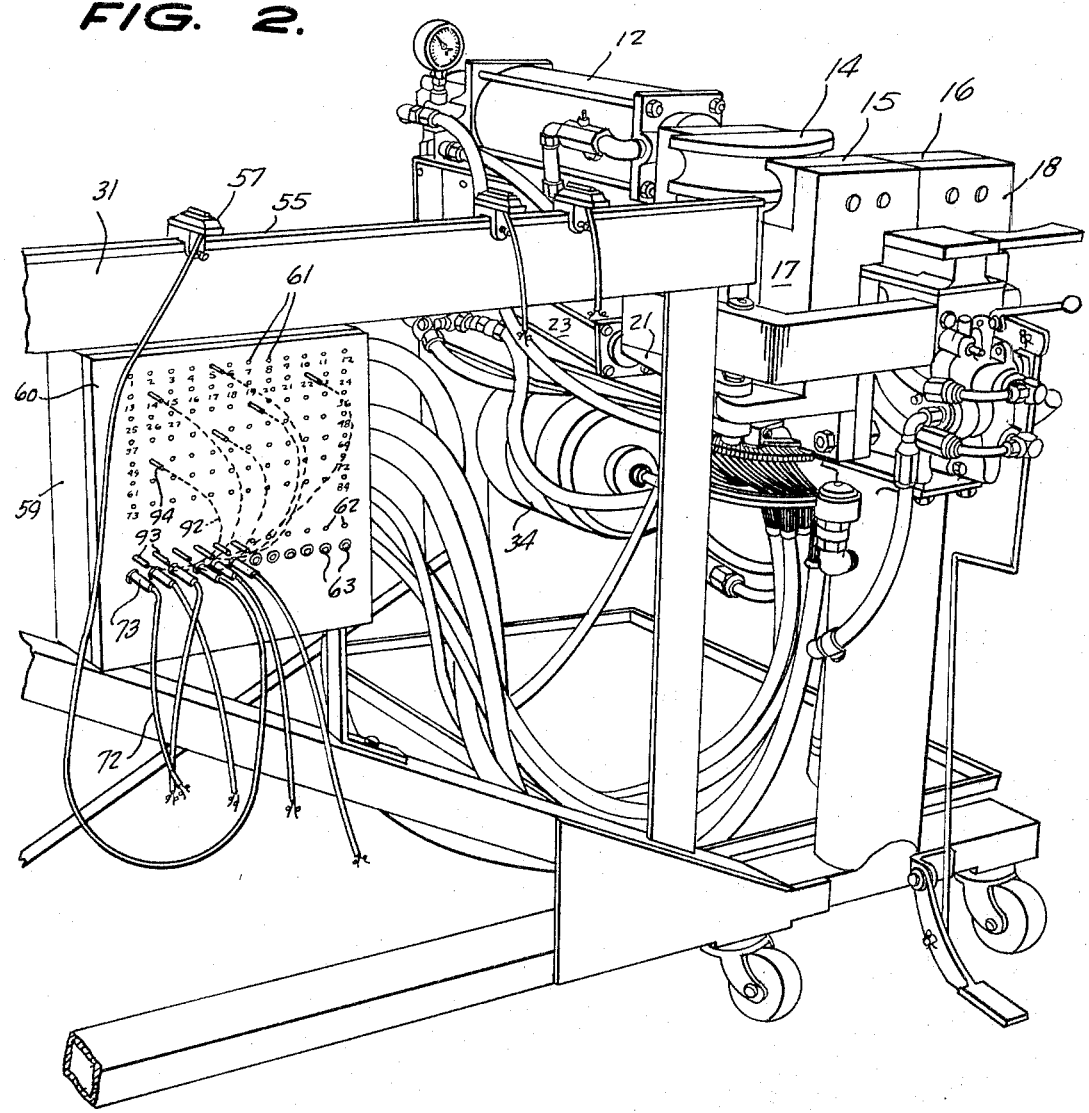
FIGURE 2 is an enlarged perspective view of the main operating portion of the bending machine of FIGURE 1 and the adjacent parts of the control apparatus of the present invention, as employed in FIGURE 1.

Referring to the drawings, 11 generally designates a hydraulically-operated tube or rod bending machine of the type provided with a main hydraulic cylinder 12 having a hydraulically-actuated piston whose piston rod 13 carries the main arcuate bending die 14. The cylinder 12 is mounted horizontally with its axis transverse to the machine, as shown in FIGURE 1. The main bending die 14 cooperates with a pair of opposing dies 15 and 16 spaced on opposite sides of the axis of the stationary main cylinder 12, said opposing dies being rotatably mounted on vertical axes spaced symmetrically on opposite sides of the transverse vertical plane containing the axis of cylinder 12. Thus, the dies 15 and 16 are mounted on respective bracket members 17 and 18 of right-angled shape having inwardly-projecting arms 19 which are pivoted on vertical supports 20 for horizontal swinging movement outwardly, the degree of outward-swinging movement of the brackets 17 and 18 and their associated dies 15 and 16 being regulated by the extension of respective piston rods 21 and 22 associated with corresponding hydraulic cylinders 23 and 24 pivoted at 25 and 26 to the frame of the machine, the respective piston rods 21 and 22 being connected to lugs 27 and 28 projecting outwardly from the bottom portions of the respective brackets 17 and 18.

The machine 11 is provided with a work-supporting frame 30 having a horizontal elongated, generally right-angled top work-supporting bar 31 which is located to support elongated objects, such as lengths of tubing or rods and to support these objects while they are being fed manually between the main die 14 and the cooperating swingable opposing dies 15 and 16. Thus, as shown in FIGURE 1, the work-supporting frame 30 extends laterally from the main frame portion 32 of the machine, the cylinders 12, 23 and 24 being mounted on the main frame portion 32, along with the parts associated therewith and the angle bar 31 being of substantial length so that it can be employed to support stock of considerable length. Also mounted on the main frame portion 32 of the machine are the hydraulic pump 33 which is driven by a motor 34, a hydraulic sump reservoir 35, and various associated hydraulic and electrical control elements, presently to be described.

The portion of the machine mounted on the frame 32 is substantially similar to a conventional tube bending machine, such as the "Huth Tube Bender," manufactured by Huth Manufacturing, Incorporated, 1048 North Lake Street, Burbank, Calif. This machine is of the manually-controlled type and normally includes a manually-operated control valve 36. In the normal position of the control valve, the valve connects a conduit 37 to another conduit 38, the conduit 38 leading to the sump reservoir 35. Also connected to the valve are additional conduits 39 and 40 which form part of the hydraulic circuit of the original machine, when it is operated by means of the manual control valve 36, but which have no function when the machine is operated by the improved control means of the present invention, presently to be described. Thus, valve 36 seals off the ends of conduits 39 and 40 in its normal position, and merely serves to establish communication between the conduits 37 and 38.

Figure 13:
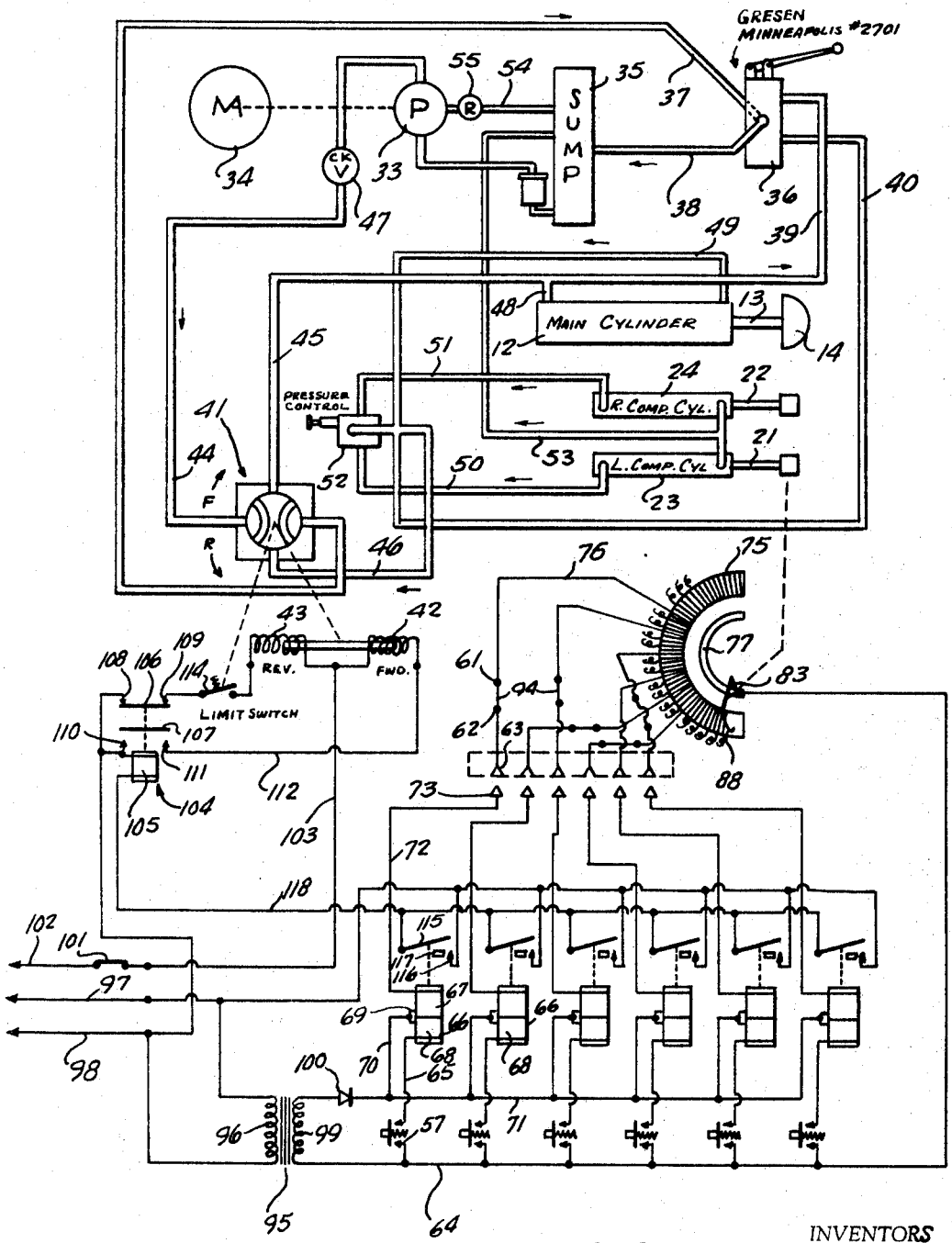
FIGURE 13 is a schematic diagram showing the electrical and hydraulic circuits employed in a tube or bar bending machine, such as is illustrated in FIGURES 1, 2 and 3, provided with the control apparatus of the present invention.

In accordance with the present invention, the machine is control by an electromagnetically-operated valve 41 of the three-position type, having the respective forward and reverse-operating coils 42 and 43 and being provided with biasing spring means which normally maintains the valve in the closed position thereof shown in FIGURE 13. When the "forward" coil 42 is energized, the valve 41 operates to establish communication between a first pair of conduits 44 and 45 connected thereto and between the second pair of conduits 37 and 46 also connected thereto. Conduit 44 is connected through a check valve 47 to the outlet of pump 33. Conduit 45 is connected by a conduit 48 to the rear portion of cylinder 12. Therefore, energization of the "forward" coil 42 causes fluid under output pump pressure to be delivered to the rear portion of the main bending cylinder 12, thereby urging piston rod 13 outwardly and causing outward bending pressure to be applied by the main bending die 14. At the same time, conduit 46 is connected to the return conduit 37, leading through the passages in the valve 36 to conduit 38 and thence to the sump reservoir 35. Conduit 46 is connected by a conduit 49 to the forward portion of main cylinder 12, whereby fluid is allowed to exhaust from said forward portion as piston rod 13 is extended. The rear portions of the cylinders 23 and 24 are connected by respective conduits 50 and 51 through an adjustable-restriction valve 52 to the conduit 46, so that fluid behind the pistons in the cylinders 23 and 24 can discharge back to the sump reservoir 35 at a restricted rate. Under these conditons, determined by the adjustment of the valve 52, thereby providing an adjusted amount of resistance to inward movement of the piston rods 21 and 22 in their respective cylinders, and thereby regulating the rate of outward rotary movement of the dies 15 and 16 caused by their reaction to the force applied by the main bending die 14. Thus, the adjustable-restriction valve 52 acts as a retarding means to slow down the inward movement of the piston rods 21 and 22 under the force transmitted thereto by the dies 15 and 16 as the main die 14 is forced outwardly against the tubing or rod element being bent.

The forward ends of the cylinders 23 and 24 are connected by a conduit 53 to the sump reservoir 35.

When the "reverse" coil 43 of the electromagnetic valve 41 is energized, the valve operates to connect conduit 44 to conduit 46 and to connect conduit 45 to conduit 37. With conduit 44 connected to conduit 46, the output fluid under pressure from pump 33 is delivered through the conduit 49 to the forward portion of main cylinder 12, causing its piston rod 13 to be retracted. Fluid from the rear portion of the main cylinder 12 is allowed to exhaust to the sump reservoir through the conduits 48, 45, valve 41, conduit 37, valve 36 and conduit 38. At the same time, fluid under pressure is delivered through valve 52 to the conduits 51 and 50, and thus, to the rear portions of cylinders 23 and 24, extending the piston rods 21 and 22, and returning the die members 15 and 16 to their normal positions, namely, to posiitons adjacent to each other, as shown in FIGURE 1.

Summarizing, energization of "forward" coil 42 places pressure fluid in conduit 45, producing extension of main die 14, whereas energization of the "reverse" coil 43 places fluid under pressure in the conduits 49, 50 and 51, retracting die 14 and returning shoes 15 and 16 to their starting positions.

The outlet of pump 33 is connected by a by-pass conduit 54 containing a relief valve 55 to the sump reservoir 35. This allows the high-pressure fluid in the outlet chamber of pump 33 to be by-passed back to the sump reservoir 35 when the valve 41 is in its closed position.

The top edge of the work-supporting bar 31 is provided with a linear distance scale 55, and adjustably mounted on the top edge for adjustment along the scale 55 are a plurality of inverted U-shaped brackets 56, each bracket having a push-button switch 57 mounted thereon. The outer legs of the brackets are provided with clamping screws 58 which are engageable with the outer surface of the vertical flange of bar 31 beneath the longitudinal scale bar 55, as shown in FIGURE 7, to clamp the associated brackets in adjusted positions.

Mounted on the control frame 30 is a housing 59 having the front panel 60 on which are mounted the horizontal and vertical rows of jacks 61 which are sequentially numbered, for example, being arranged in horizontal rows containing twelve jacks and comprising seven such horizontal rows, as illustrated, merely by way of example. Each jack is identified by a specific number, the numbers being arranged in sequence. A further horizontal row of jacks 62 is provided on the panel 60, spaced below the above-mentioned rows of jacks 61, the respective jacks 62 being each connected to one of a subjacent row of additional jacks 63 mounted on panel 60. One terminal of each switch 57 is connected to a common wire 64, as shown in FIGURE 13, and the remaining terminal of each switch 57 is connected by a wire 65 to an associated double-wound relay 66. Thus, each relay 66 has the upper and lower windings 67 and 68, the associated wire 65 being connected to one terminal of the lower winding 68. The inner terminals of the windings 67 and 68 are connected together, as shown at 69 and are connected by a wire 70 to another common wire 71. The remaining terminal of each upper winding 67 is connected by a cable 72 and its plug 73 with one of the jacks 63.

Mounted in the main frame 32 beneath and coaxially with the pivot support 20 for the shoe bracket 17 is a stationary, substantially semicircular commutator assembly 75, each of whose segments is connected by a wire 76 to one of the jacks 61, so that each of the jacks 61 corresponds to a specific angular position of rotation of the shoe bracket 17. The commutator 75 is provided with the inner semicircular stationary contact ring 77, concentric with the commutator segments, as shown in FIGURE 13, the wire 64 being connected to said contact ring 77. Secured to the underside of the shoe bracket 17 and extending radially over ring 77 and the commutator segments, as shown at 78, is a block of insulation 79 to the bottom of which is secured a conductive plate member 80 formed at its opposite ends with respective depending vertical brush housings 81 and 82, as shown in FIGURE 5. The brush housing 81 overlies the ring 77 and contains a depending contact brush 83 which is urged into conductive engagement with the ring 77 by a coiled spring 84 bearing between the top end of the brush 83 and an insulating disc 85 provided thereabove in the counterbore which receives the head of one of the fastening bolts 87 for block 79, as shown in FIGURE 5. The opposite depending brush housing 82 contains a brush element 88 whose lower end slidably engages on the commutator segments 78 and is urged thereagainst by a spiral spring 89 having its inner end secured to a vertical flange 90 depending from plate member 80 and having its free outer end engaged on the top surface of the brush member 88, as is clearly shown in FIGURE 5. Thus, the ring 77 is electrically-connected to the commutator segments 78 engaged by brush 88.

The jacks 62 are selectively connected to the jacks 61 by jumper cables 92 provided at their opposite ends with suitable plugs 93 and 94 engageable, respectively, in the jacks 62 and 61. Thus, the top terminal of each upper relay coil 67 may be connected to a selected commutator segment 78 and will, therefore, be connected to wire 64 when brush 88 engages said commutator segment.

Designated at 95 is a transformer having its primary winding 96 connected across respective line wires 97 and 98 of a three-phase supply system. The transformer 95 is provided with the secondary winding 99, one of whose terminals is connected to the wire 64, and the other of whose terminals is connected through a rectifier 100 to the wire 71. Therefore, each upper winding 67 will become energized when brush 88 engages the commutator segment 78 to which it has been connected by the selection of the appropriate jack 61 for the reception of its associated jumper cable plug 94. As will be presently explained, this establishes the limiting position of outward rotation of the shoe bracket 17, and since the shoe brackets 17 and 18 are symmetrically related, this limits the outward rotation of both shoe brackets.

The remaining three-phase supply line 102 is connected through a control switch 101 to a wire 103 which is, in turn, connected to the common inner terminals of the "forward" and "reverse" solenoid valve windings 42 and 43, as shown in FIGURE 13. As shown in FIGURE 1, the control switch 101 may be foot-operated. Designated at 104 is a two-pole relay having the operating winding 105 and the respective poles 106 and 107. When the winding 105 is de-energized, the upper pole 106 engages and bridges a pair of contacts 108 and 109, being disengaged therefrom when winding 105 becomes energized. When said winding 105 becomes energized, the lower pole 107 engages a pair of contacts 110 and 111.

The contacts 108 and 110 are connected to the line wire 98. The contact 111 is connected by a wire 112 to the remaining terminal of the "forward" valve winding 42. The contact 109 is connected through a limit switch 114 to the remaining terminal of the "reverse" valve winding 43. The limit switch 114 is of the normally-closed type, but is held open by the movable element of valve 41 when it returns to its closed position following the energization of the "reverse" winding 43. Thus, switch 114 closes as soon as the movable element of valve 41 has been moved from its normal closed position, for example, by the energization of the "forward" winding 42.

Each of the double-wound relays 66 is provided with a pole 115 which is engageable with a stationary contact 116 responsive to the energization of the lower winding 68, being latched down by a permanent magnet 117, which holds the pole 115 in engagement with the contact 116 until the upper winding 67 becomes energized, whereby the force of the holding magnet 117 is overcome, allowing pole 115 to disengage from contact 116 under the action of conventional spring-biasing means. Thus, each relay 66 is provided with such conventional spring-biasing means holding its pole 115 in open position. When the lower winding 68 becomes energized, the force of the biasing means is overcome, causing the pole 115 to be lowered into engagement with its associated contact 116, whereupon such engagement will be maintained by the action of the permanent magnet 117 after the lower winding 68 becomes de-energized. This will continue until the upper winding 67 becomes energized, at which time the pole 115 will disengage from its contact 116.

The respective relay poles 115 are connected to a common wire 118 which is, in turn, connected to the lower terminal of the winding 105 of relay 104, the upper terminal thereof being connected to the line wire 98, as shown. Each of the relay contacts 116 is connected to the line wire 97. Thus, when any of the lower windings 68 of the double-wound relays 66 becomes energized, its contacts 115, 116 close and establish an energizing circuit for the winding 105 of relay 104 comprising line wire 98, winding 105, wire 118, the contacts 115, 116, and the line wire 97. Energization of relay 104 causes pole 107 to bridge contacts 110 and 111, energizing the "forward" valve coil 42, through a circuit which includes the switch 101, assumed to be closed, as follows: Wire 102, switch 101, wire 103, "forward" coil 42, wire 112, relay contacts 111, 107, 110, and line wire 98. This causes operation of the bending machine by causing piston rod 13 to become extended in the manner above-described which produces a reaction on the piston rods 21 and 22 and the pivoted shoe brackets 17 and 18 tending to swing the brackets outwardly, thus moving brush 88 along the commutator 75 until said brush engages a commutator segment connected to the upper coil 67 of the initially-energized double-wound relay 66. This causes the pole 115 of said double-wound relay to disengage from its contact 116, opening the circuit of the relay winding 105 so that pole 107 disengages from the stationary contacts 110 and 111 and the upper contact member 106 re-engages with the stationary contacts 108 and 109. Since the limit switch 114 is closed, this energizes the "reverse" solenoid coil 43 by a circuit comprising line wire 98, contacts 108, 106, 109, switch 114, winding 43 and line wire 103. Energization of coil 43 reverses valve 41, causing piston rod 13 to be retracted in the manner above-described, and returning the piston rods 21 and 22 to their original positions, also restoring the die members 15 and 16 to their initial positions, namely, adjacent to each other, as shown in FIGURE 1. When the movable member of valve 41 returns to its starting position, the limit switch 114 opens, de-energizing the "reverse" coil 43, restoring the parts to their original conditions.

As will be readily understood, energization of any of the lower windings 68 can be accomplished by actuating the associated push-button switch 57, since this connects the winding 68 across wires 71 and 64. The associated release winding 67 becomes energized in the manner above-described, namely, when the brush 88 reaches the commutator segment connected to the selected bend-angle-determining jack 61.

As shown in FIGURE 2, the jacks 61 are numbered in sequence, corresponding to the sequence of the commutator segments 78 so that each jack represents a specific bend angle.

Designated generally at 120 is an indexing disc assembly which is attached to the end of a length of tubing 121 to be formed with a series of bends. The indexing assembly 120 is employed for the purpose of properly positioning the length of tubing 121 longitudinally along the angle bar 31, as well as indexing the length of tubing angularly around its longitudinal axis while the required bends are formed in the tubing. The assembly 120 comprises the circular main disc member 122 formed with a central aperture 123 and provided on opposite sides thereof with annual reinforcing washers 124 and 125 secured to the opposite surfaces of the disc 122 concentrically therewith by transverse pins 126. An axial clamping bolt 127 extends through the central apertures of the washers 125 and 124 and through the central aperture 123 of disc meber 122, extending axially through an expansion sleeve assembly 128. The expansion sleeve assembly 128 comprises a plurality of segments 129 yieldably held together by a pair of retaining springs 130, 130 surrounding the segments and being received in annular grooves 131 provided therein adjacent the opposite ends of the assembly, as is clearly shown in FIGURE 8. The cooperating segments 129 are of identical construction and when held together, have a substantially cylindrical external contour and are formed to define a substantially frusto-conical, forwardly-flaring interior recess 132 in which is received a frusto-conical plug member 133 through which the bolt 127 is threadedly engaged, as shown in FIGURE 8.

One of the segments 129 is provided with an inwardly-projecting lug 135 which is received in a longitudinal keyway 136 formed in the exterior peripheral portion of plug 133 so as to hold the plug against rotation in the sleeve assembly 128 when bolt 127 is rotated. The split wedging sleeve assembly 128 is adapted to be inserted inside the end of the length of tubing 121 to be bent, in the manner illustrated in FIGURE 8, and to be clampingly held therein by tightening the bolts 127, which draws the frusto-conical plug 133 into the recess 132, exerting a wedging action on the segments 129 which are, therefore, expanded outwardly and which thus clampingly engage the inside surface of the end of the length of tubing 121. This firmly secures the indexing disc assembly 120 to the end of the length of tubing, holding the circular main disc member 122 rigidly relative to the length of tubing so that the disc member 122 may be employed to turn the length of tubing as required to form bends of specified orientation on said length of tubing in a manner presently to be described.

The periphery of the disc member 122 is provided with the spaced pin-receiving sockets 138, in accordance with the number of bends to be formed in the length of tubing 121 with which the disc member 122 is associated, and spaced angularly around its axis in the same manner as the desired bends. Thus, for example, in the assembly shown in FIGURE 9, the disc member 122 is provided with six angularly-spaced pin-receiving socket elements 138 which correspond to the angular position of a series of specified bends to be formed in a length of tubing 121 and which are numbered to correspond to the required sequence of said bends. As will be readily apparent, the disc member 122 serves as a pattern for forming bends in a particular tailpipe or exhaust pipe for a particular model of automobile, making it possible to accurately duplicate the pipes, as will be presently described, and serving to eliminate the necessity for maintaining a stock of tailpipes for each of the various models of automobiles.

The inner vertical arms of the respective bracket members 56 are formed with inwardly-projecting pins 140 receivable in the sockets 138 and cooperating therewith to maintain the disc member 122 at specified angular positions while the bends are being made in the associated length of tubing 121. Therefore, after the first bend has been made, each of the subsequent bends will be accurately located angularly around the axis of the length of tubing by engaging the pins 140 in the respective sockets 138 in their required sequence as the successive bends are made in the length of tubing.

As above-explained, the switch assemblies 57 are positioned along the linear unit scale 55 and clamped in locations corresponding to the locations of the successive bends to be formed in a length of tubing 121. In forming the first bend, the disc member 122, secured to the end of the initially straight length of tubing 121 in the manner above-described, is placed adjacent the first switch assembly 57 with the length of tubing extending between the main bending die 14 and the cooperating auxiliary die elements 15, 16, the disc 122 being rotated to engage the pin 140 of the first switch assembly 57 in the socket element 138 numbered "1" on the disc member. The first bend is then made by first pressing the push button-operating element of the first switch 57, which energizes relay 104, causing pole 107 to bridge contacts 110, 111. The operator then actuates the foot-operated switch 101, causing the "forward" valve coil 42 to be energized, producing the required first bend, in the manner above-described, the free end of the pipe carrying the disc member 122 being free to deflect as the bending action takes place. As shown in FIGURE 1, the operator may hold the length of tubing 121 to support same adjacent the indexing disc assembly 120 while the dies 14, 15 and 16 cooperate to form the required bend. Said bend is made automatically, by the action of the elements above-described, namely, by the cooperation of the moving brush 88 with the commutator 75 and in accordance with the jack 61 selected for the first bend. After the required bend has been made, the length of tubing 121 is automatically released, by the energization of the "reverse" coil 43 in the manner above-described, said coil finally becoming de-energized by the opening of limit switch 114. The length of tubing 121 is then pushed forward between the main die 14 and the cooperating pair of dies 15, 16 to place the disc member 122 adjacent the second switch 57, the disc member being rotated to engage the pin 140 of the second switch assembly 57 in the socket element 138 numbered "2" on the disc member 122. This establishes the required orientation for the second bend around the axis of the length of tubing 121. The push button of the second switch 57 is then actuated to energize the relay 104, and the foot-operated switch 101 is then actuated momentarily to bring the main clamping die 114 outwardly a sufficient distance to clamp the length of tubing 121. Thereafter, the operator grasps the length of tubing 121 near the indexing assembly 120, in the manner as shown in FIGURE 1, to support the tubing, and then re-closes the switch 101 to complete the required bend, with the tubing being allowed to deflect away from angle bar 31, as illustrated in FIGURE 1.

This process is repeated, pushing the length of tubing 121 forwardly between the cooperating die elements 14, 15 and 16 successively from one switch assembly 57 to the next, until all the required bends have been made in the tubing.

FIGURE 12 illustrates a typical information card 145 which may be used to specify the requirements of a particular tailpipe or other bent elongated member formed by the apparatus of the present invention. The information card 145 may provide the necessary data for selecting the required straight piece of stock, for example, may give the pipe diameter and its length, may give the required number of bends as "number of stops", may give the location of disc 122 along scale 55 as "stop lengths", may give the angular position of the length of pipe at each bend in "degrees", may specify the lengths of the shoe members 15, 16 by the designation "block", and may specify the radius of the main die 14. Thus, a first row of data 146 on the card gives the number of stops, a second row of data 147 gives the stop lengths, a third row of data 148 gives the angular orientation in degrees around the axis of the tubing at each of the bends, a fourth row of data 149 gives the length of the shoes 15, 16, and the fifth row of data 150 gives the radius of the main die 14. In the typical information card 145 shown in FIGURE 12 there are six stops or bends, the same shoe members 15, 16 are employed for all the bends, and the same main die 14 is likewise employed for all the bends. The information card 145 also gives the necessary information to form the pattern or indexing disc 122 for the associated tailpipe or other elongated member to be bent, since it gives the angular spacings in line 148 which must be employed between the socket elements 138 in the periphery of the disc, or at least gives the numerical data from which such angular spacings can be calculated. As will be readily apparent, by maintaining a suitable file of cards 145, each card being associated with a particular tailpipe, and being associated with a known model of motor vehicle using said tailpipe, it is possible to fabricate suitable indexing disc members 122 for the respective models and to use the proper disc in forming any required tailpipe by employing the rest of the data provided on the associated information card 145. As above-mentioned, this makes it possible to avoid the necessity of maintaining an inventory of tailpipes for all the different motor vehicles, in order to fill orders for same. It is merely necessary to maintain a supply of straight lengths of tubing from which the desired tailpipes can be fabricated, employing the machine and control apparatus of the present invention and using the data from the file cards 145 and the indexing discs 122 associated with the respective tailpipe models.

It will also be further apparent that since the fabrication of the tailpipes are based on the use of specific patterns or indexing disc elements 122, along with specific set-ups of the successive switch assemblies 57, as given by the associated information card 145, there will be a maximum degree of reproducibility of the tailpipes, since each tailpipe made by the use of a particular indexing disc 122 and from the information provided on a specific card 145 will be made in exactly the same manner and to the same specifications.

It will be noted that in line 148 of the information card 145 the numbers appearing in the respective columns are the numbers of respective jacks 61 on the panel 60, indicating where the plugs 94 associated with the respective control switch assemblies 57 must be engaged to provide the required angles of bend. The numbers in line 148 of card 145 thus do not necessarily indicate the number of degrees in the bend angles, but merely serve as means to identify the jack 61 to be selected for each respective bending position.

As shown in FIGURE 7, a longitudinally-extending wear strip 160 is secured on the rear margin of the horizontal flange of angle bar 31 to serve as a flat bearing surface on which the indexing disc 122 is engaged when a selected socket element 138 thereof is engaged with the appropriate indexing pin or lug 140.

While a specific embodiment of an automatic tube and bar bending machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an apparatus for bending elongated objects, a work support, a fluid pressure-operated main die provided with an operating cylinder mounted transverse to said work support, a pair of opposing dies rotatably-mounted opposite said main die and being mounted for rotation on parallel axes arranged on opposite sides of the main die, said opposing dies spreading apart and rotating outwardly from said main die responsive to bending force applied by said main die to an object disposed between the main die and said opposing dies, a source of pressure fluid, conduit means to connect said source to said operating cylinder to initiate a bending stroke of said main die, a brush element carried by one of said opposing dies, a stationary commutator having arcuately-arranged segmented engageable by said brush element as said one of the opposing dies rotates outwardly, electrically-actuated reversing means operatively-connected to said operating cylinder, and an energizing circuit connected to said reversing means and including said brush element and a selected commutator segment, said selected segment corresponding to a predetermined angle of separation of said opposing dies.

2. In combination with the apparatus of claim 1, a circular indexing member engageable on the work support, and means to detachably secure said indexing member coaxially to an elongated object received between the main die and the opposing dies to position the object relative to the work support for a bend.

3. In an apparatus for bending elongated objects, a work support, a fluid pressure-operated main die provided with an operating cylinder mounted transverse to said work support, a pair of opposing dies rotatably-mounted opposite said main die and being mounted for rotation on parallel axes arranged on opposite sides of the main die, said opposing dies spreading apart and rotating outwardly from said main die responsive to bending force applied by said main die to an object disposed between the main die and said opposing dies, a source of pressure fluid, conduit means including a control valve connecting said source to said operating cylinder, means to open said control valve to initiate a bending stroke of said main die, electrically-actuated closing means operatively-connected to said control valve, a brush element carried by one of said opposing dies, a commutator having arcuately-arranged segments engageable by said brush element as said one of the opposing dies rotates outwardly, and an energizing circuit connected to said closing means and including said brush element and a selected commutator segment, said selected segment corresponding to a predetermined angle of separation of said opposing dies, whereby to terminate the bending stroke responsive to the outward rotation of said opposing dies to said predetermined angle of separation.

4. In an apparatus for bending elongated objects, a work support, a fluid pressure-operated main die provided with an operating cylinder mounted transverse to said work support, a pair of opposing dies rotatably-mounted opposite said main die and being mounted for rotation on parallel axes arranged on opposite sides of the main die, said opposing dies spreading apart and rotating outwardly from said main die responsive to bending force applied by said main die to an object disposed between the main die and said opposing dies, a source of pressure fluid, conduit means including an elecetromagnetic reversible control valve connecting said source to said operating cylinder, said control valve having a forward winding and a reverse winding, means connecting said source to said operating cylinder in a manner to extend said main die for a bending stroke responsive to the energization of said forward winding, means to connect said source to the operating cylinder in a manner to retract the main die responsive to the energization of the reverse winding, a double-wound latching relay having a latching winding and a release winding, means to at times energize said latching winding, means to energize said forward winding to initiate and maintain a bending stroke responsive to the energization of said latching winding, a brush element carried by one of the opposing dies, a stationary commutator having spaced segments located concentrically with the path of rotation of said brush element and being successively engaged by the brush element as said one of the opposing dies rotates outwardly, an energizing circuit including said brush element, a source of current and said release winding, means to selectively connect said energizing circuit to said commutator segments, whereby to energize the release winding, release the latching relay and de-energize said forward winding when the brush element engages a selected segment, at a corresponding predetermined angle of separation of said opposing dies, and means to energize said reverse winding substantially simultaneously with said de-energization of the forward winding, whereby to retract said main die.

5. In an apparatus for bending elongated objects, a work support, a fluid pressure-operated main die provided with an operating cylinder mounted transverse to said work support, a pair of opposing dies rotatably-mounted opposite said main die and being mounted for rotation on parallel axes arranged on opposite sides of said main die, said opposing dies spreading apart and rotating outwardly from said main die responsive to bending force applied by said main die to an object disposed between the main die and said opposing dies, a source of pressure fluid, conduit means including an electromagnetic reversible control valve connecting said source to said operating cylinder, said control valve having a forward winding and a reverse winding, means connecting said source to said operating cylinder in a manner to extend said main die after a bending stroke responsive to the energization of said forward winding, means to connect said source to the operating cylinder in a manner to retract the main die responsive to the energization of the reverse winding, a double-wound latching relay having a latching winding and a release winding, means to at times energize said latching winding, means to energize said forward winding to initiate and maintain a bending stroke responsive to the energization of said latching winding, a brush element carried by one of the opposing dies, a stationary commutator having spaced segments located concentrically with the path of rotation of said brush element and being successively engaged by the brush element as said one of the opposing dies rotates outwardly, an energizing circuit including said brush element, a source of current and said release winding, means to selectively connect said energizing circuit to said commutator segments, whereby to energize the release winding, release the latching relay and de-energize said forward winding when the brush element engages a selected segment, at a corresponding predetermined angle of separation of said opposing dies, and means to energize said reverse winding responsive to the release of the latching relay, whereby to retract said main die.

6. In an apparatus for bending elongated objects, a work support, a fluid pressure-operated main die provided with an operating cylinder mounted transverse to said work support, a pair of opposing dies rotatably-mounted opposite said main die and being mounted for rotation on parallel axes arranged on opposite sides of said main die, said opposing dies spreading apart and rotating outwardly from said main die responsive to bending force applied by said main die to an object disposed between the main die and said opposing dies, a source of pressure fluid, conduit means including an electromagnetic reversible control valve connecting said source to said operating cylinder, said control valve having a forward winding and a reverse winding, means connecting said source to said operating cylinder in a manner to extend said main die for a bending stroke responsive to the energization of said forward winding, means to connect said source to the operating cylinder in a manner to retract the main die responsive to the energization of the reverse winding, a latching relay having a latching winding and a release winding, means to energize said forward winding to initiate a bending stroke responsive to the energization of the latching winding of said latching relay, means to energize said latching winding, a first contact element carried by one of the opposing dies and moving therewith, a plurality of stationary arcuately-arranged contact elements mounted in the path of movement of the first contact element and being spaced from each other and normally spaced from said first contact element, means to energize said release winding of said latching relay responsive to the engagement of said first contact element with a selected one of said stationary contact elements, whereby to de-energize the forward winding, and means to energize said reverse winding responsive to the release of the latching relay, whereby to retract said main die.

7. In an apparatus for bending elongated objects, an elongated work support, a fluid pressure-operated main die provided with an operating cylinder mounted transverse to said work support, a pair of opposing dies rotatably-mounted opposite said main die and being mounted for rotation on parallel axes spaced on opposite sides of the main die, said opposing dies spreading apart and rotating outwardly from said main die responsive to bending force applied by said main die to an elongated object on the work support disposed between the main die and said opposing dies, a source of pressure fluid, conduit means including an electromagnetic reversible control valve connecting said source to said operating cylinder, said control valve having a forward winding and a reverse winding, means connecting said source to said operating cylinder in a manner to extend said main die for a bending stroke responsive to the energization of said forward winding, means to connect said source to said operating cylinder in a manner to retract the main die responsive to the energization of the reverse winding, a plurality of latching relays each having a latching winding and a release winding, means to energize said forward winding to initiate a bending stroke responsive to the energization of the latching winding of any of said latching relays, a source of current, respective control switches spaced along said work support and connected in circuit between said source of current and the latching windings of said latching relays for selectively energizing the latching relays, means to energize the release winding and to thereby release each latching relay responsive to the outward rotation of said opposing dies to a respective predetermined angle of separation, and means to energize said reverse winding responsive to the release of a previously energized latching relay, whereby to retract said main die.

8. The apparatus of claim 7, and means to releasably secure said control switches in selected positions along the work support.

9. In combination with the apparatus of claim 7, a circular indexing member engageable on the work support, means to detachably secure said indexing member co-axially to an elongated object received between the main die and the opposing dies, said indexing member being formed with spaced indexing recesses on its periphery, and projections on the respective control switches engageable in said recesses to angularly-position the object for a bend at each of the locations of said switches along the work support.

10. In an apparatus for bending elongated objects, an elongated work support, a fluid pressure-operated main die provided with an operating cylinder mounted transverse to said work support, a pair of opposing dies rotatably-mounted opposite said main die and being mounted for rotation on parallel axes spaced on opposite sides of the main die, said opposing dies spreading apart and rotating outwardly from said main die responsive to bending force applied by said main die to an elongated object on the work support disposed between the main die and said opposing dies, a source of pressure fluid, conduit means including an electromagnetic reversible control valve connecting said source to said operating cylinder, said control valve having a forward winding and a reverse winding, means connecting said source to said operating cylinder in a manner to extend said main die for a bending stroke responsive to the energization of said forward winding, means to connect said source to said operating cylinder in a manner to retract the main die responsive to the energization of the reverse winding, a plurality of latching relays each having a latching winding and a release winding, means to energize said forward winding to initiate a bending stroke responsive to the energization of any of the latching windings of said latching relays, a source of current, respective control switches spaced along said work support and connected in circuit between said source of current and the latching windings of said latching relays for selectively energizing the latching relays, each latching relay having a release winding, means to energize each release winding responsive to the rotation of said opposing dies to a respective predetermined angle of separation, and means to energize said reverse winding responsive to the release of a previously energized latching relay, whereby to retract said main die.

11. In an apparatus for bending elongated objects, an elongated work support, a fluid pressure-operated main die provided with an operating cylinder mounted transverse to said work support, a pair of opposing dies rotatably-mounted opposite said main die and being mounted for rotation on parallel axes spaced on opposite sides of the main die, said opposing dies spreading apart and rotating outwardly from said main die responsive to bending force applied by said main die to an elongated object on the work support disposed between the main die and said opposing dies, a source of pressure fluid, conduit means including an electromagnetic reversible control valve connecting said source to said operating cylinder, said control valve having a forward winding and a reverse winding, means connecting said source to said operating cylinder in a manner to extend said main die for a bending stroke responsive to the energization of said forward winding, means to connect said source to said operating cylinder in a manner to retract the main die responsive to the energization of the reverse winding, a plurality of latching relays each having a latching winding and a release winding, means to energize said forward winding to initiate a bending stroke responsive to the energization of the latching windings of any of said latching relays, a source of current, respective control switches spaced along said work support and connect in circuit between said source of current and the latching windings of said latching relays for selectively energizing the latching relays, a first contact element carried by one of the opposing dies and moving therewith, a plurality of arcuately-arranged stationary contact elements mounted in the path of movement of the first contact element and being spaced from each other and being normally spaced from said first contact element, means to energize each release winding when the first contact element engages a respective one of the stationary contact elements, whereby to release the associated latching relay, and means to energize said reverse winding responsive to the release of a previously energized latching relay, whereby to retract said main die.

12. The bending apparatus of claim 11, and wherein said stationary contact elements comprise an arcuate commutator concentric with the arc of movement of said one of the opposing dies, and wherein the means to energize the release windings includes means to selectively connect the release windings to the commutator segments.

13. The bending apparatus of claim 11, wherein said stationary contact elements comprise an arcuate commutator concentric with the arc of movement of said one of the opposing dies, and wherein the means to energize the release windings comprises an arcuate contact strip concentric with the commutator, means connecting said contact strip to the first contact element, means to selectively connect the release windings to the commutator segments, and means connecting the source of current in circuit with said contact strip and release windings.

14. An indexing assembly for positioning a hollow elongated object in a bending machine comprising a circular disc member formed with spaced peripheral recesses corresponding to respective orientations of the elongated object around its axis while it is being bent in the machine, an expansible sleeve element receivable in the end of the elongated object, a tapered wedging member received in said sleeve element, and bolt means extending axially through said disc member and sleeve element and threadedly engaged with said wedging member for moving the wedging member into the sleeve element, whereby to expand the sleeve element.

15. An indexing assembly for positioning a pipe in a bending machine comprising a circular disc member formed with spaced peripheral recesses corresponding to respective orientations of a pipe around its axis while it is being bent in the machine, an expansible sleeve receivable in a pipe and having a frusto-conical inwardly-tapering bore, a frusto-conical wedging member received in said bore, and a tightening bolt extending axially through said disc member and sleeve and threadedly engaged axially with said wedging member for moving the wedging member into the sleeve, whereby to expand the sleeve.

16. The indexing assembly of claim 15, and wherein said sleeve comprises a plurality of longitudinal segments, yieldable retaining means surrounding said segments, and iinterengaging means on at least one of said longitudinal segments and said wedging member to hold the wedging member against rotation relative to said sleeve.

References Cited

UNITED STATES PATENTS

| | | | |
|---|---|---|---|
| 2,382,745 | 8/1945 | Powers | 72—7 |
| 3,145,756 | 8/1964 | Hill | 72—7 |
| 3,181,323 | 5/1965 | Bos | 72—26 |
| 3,299,681 | 1/1967 | Hautau | 72—7 |

RICHARD J. HERBST, *Primary Examiner.*

R. D. GREFE, *Examiner.*